(12) United States Patent
Tamaoka (10) Patent No.: US 7,411,762 B2
(45) Date of Patent: Aug. 12, 2008

(54) FLUID DYNAMIC PRESSURE BEARING INCLUDING DYNAMIC PRESSURE GENERATING GROOVES, AND SPINDLE MOTOR AND DISC DRIVE INCLUDING THE BEARING

(75) Inventor: Takehito Tamaoka, Kyoto (JP)

(73) Assignee: Nidec Corporation, Minami-ku, Kyoto (JP)

( * ) Notice: Subject to any disclaimer, the term of this patent is extended or adjusted under 35 U.S.C. 154(b) by 487 days.

(21) Appl. No.: 11/163,064

(22) Filed: Oct. 4, 2005

(65) Prior Publication Data

US 2006/0072242 A1   Apr. 6, 2006

(30) Foreign Application Priority Data

Oct. 4, 2004   (JP)   ............................. 2004-291418

(51) Int. Cl.
*G11B 17/02*   (2006.01)
*F16C 17/10*   (2006.01)
*F16C 33/10*   (2006.01)
*F16C 35/10*   (2006.01)
*H02K 5/16*   (2006.01)
*H02K 7/08*   (2006.01)

(52) U.S. Cl. .................... 360/99.08; 384/107; 384/115; 384/120

(58) Field of Classification Search ............. 360/98.07, 360/99.08; 384/107, 111, 114, 115, 118, 384/120
See application file for complete search history.

(56) References Cited

U.S. PATENT DOCUMENTS

| 6,250,807 | B1 | 6/2001 | Mori et al. |
| 6,299,356 | B1 | 10/2001 | Okamura et al. |
| 6,339,270 | B1 * | 1/2002 | Ichiyama ................. 360/98.06 |
| 6,340,854 | B1 * | 1/2002 | Jeong ......................... 384/107 |
| 6,456,458 | B1 * | 9/2002 | Ichiyama ................. 360/99.08 |
| 6,672,767 | B2 | 1/2004 | Hajota et al. |
| 6,768,236 | B2 * | 7/2004 | Tokunaga et al. ........... 384/107 |
| 2004/0013329 | A1 * | 1/2004 | Yamashita et al. .......... 384/107 |
| 2004/0145260 | A1 * | 7/2004 | Tamaoka et al. ............. 310/90 |
| 2005/0025405 | A1 * | 2/2005 | Tamaoka .................... 384/107 |

FOREIGN PATENT DOCUMENTS

| JP | H10-220461 A | 8/1998 |
| JP | H10-311330 A | 11/1998 |
| JP | 2001-003929 A | 1/2001 |
| JP | 2001-124059 A | 5/2001 |
| JP | 3377681 B2 | 12/2002 |
| JP | 2005-090637 A | 4/2005 |

* cited by examiner

*Primary Examiner*—Craig A Renner
(74) *Attorney, Agent, or Firm*—Voletine & Whitt, PLLC (57) ABSTRACT

In a fluid dynamic pressure bearing, upper herringbone grooves and lower herringbone grooves continuous with the upper herringbone grooves are formed on the inner peripheral surface of a sleeve by plastic deformation. In addition, an annular groove recessed radially inward is formed on the outer peripheral surface of the shaft in a location opposing the region where the upper herringbone grooves and the lower herringbone grooves adjoin.

18 Claims, 11 Drawing Sheets

Prior Art

FIG. 11
Prior Art

FLUID DYNAMIC PRESSURE BEARING INCLUDING DYNAMIC PRESSURE GENERATING GROOVES, AND SPINDLE MOTOR AND DISC DRIVE INCLUDING THE BEARING

BACKGROUND OF THE INVENTION

1. Field of the Invention

The present invention relates to a fluid dynamic pressure bearing, a spindle motor including this fluid dynamic pressure bearing, and a recording disk drive including this spindle motor.

2. Description of the Related Art

Figure 10:
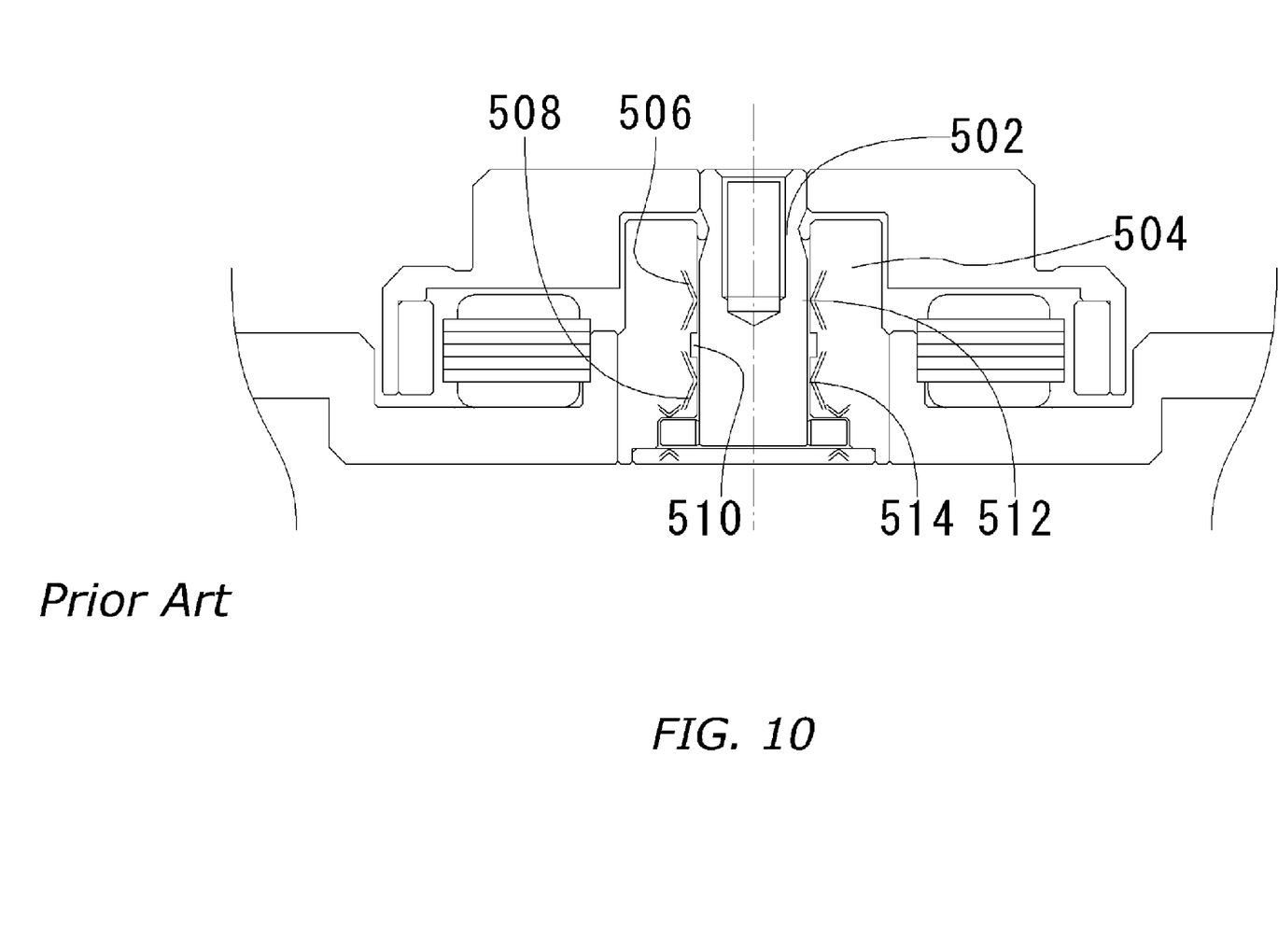
FIG. 10 is a longitudinal sectional view that depicts a conventional spindle motor.

Conventionally, a bearing of a motor that drives a recording disk employed in a hard disk drive, a removable disk drive or the like has been variously proposed. As shown in FIG. 10, for example, fluid dynamic pressure bearings 512 and 514 using a dynamic pressure generated from a lubricating fluid such as an oil held in micro gaps between a shaft 502 and a sleeve 504 during rotation of the motor are employed as bearings of the motor.

For the fluid dynamic pressure bearings 512 and 514, a pair of dynamic pressure-generating grooves 506 and 508 are formed on an inner peripheral surface of the sleeve 504. These dynamic pressure-generating grooves 506 and 508 are herringbone-shaped, spiral or the like. The paired dynamic pressure-generating grooves 506 and 508 are adjacent to each other and constituted by alternately arranged hills and grooves, respectively. A difference in height between the hill and the groove corresponds to a depth of each dynamic pressure groove.

As a method for forming these dynamic pressure-generating grooves 506 and 508, press working is often selected. The press working is a method for pressing a hard cylindrical pin having a groove pattern formed on its outer periphery against an inner peripheral surface of the sleeve 504, and for transferring the groove pattern onto the inner peripheral surface of the sleeve 504. Since the press working enables simultaneously forming the paired dynamic pressure-generating grooves 506 and 508 on the inner peripheral surface of the sleeve 504, the sleeve 504 can be manufactured at a low cost, as compared with other machining methods such as electrochemical machining and rolling.

Figure 11:
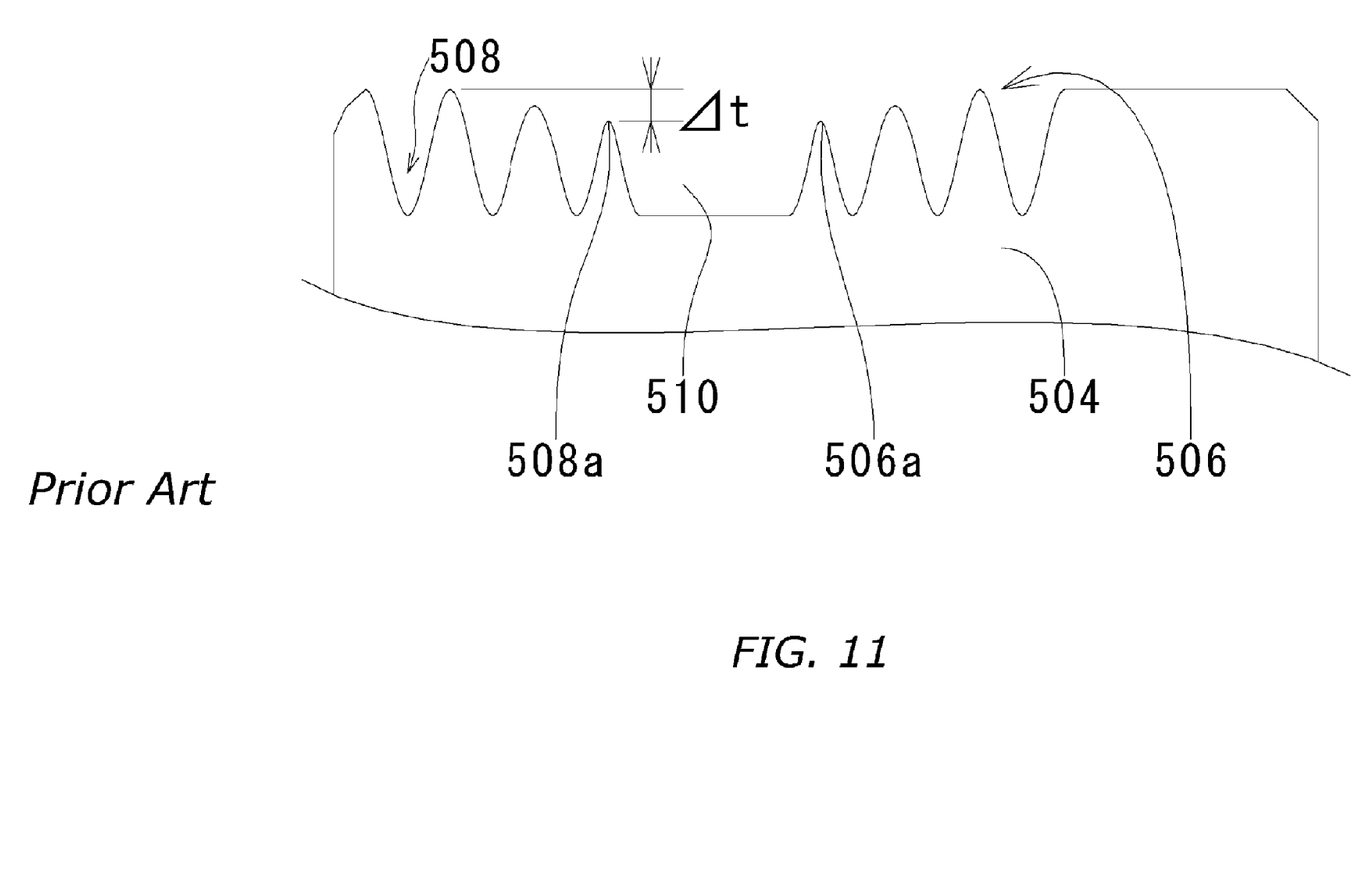
FIG. 11 is an enlarged cross-sectional view that depicts important parts of the spindle motor shown in FIG. 10.

FIG. 11 is an enlarged cross-sectional view that depicts important parts of the spindle motor shown in FIG. 10. FIG. 11 is an enlarged view that particularly depicts the inner peripheral surface of the sleeve 504 on which the dynamic pressure-generating grooves 506 and 508 are formed. An annular groove 510 is formed between the dynamic pressure-generating grooves 506 and 508 on the inner peripheral surface of this sleeve 504. By forming the annular groove 510, a radial gap between the annular groove 510 and a shaft 502 facing the annular groove 510 is enlarged. It is thereby possible to prevent an increase in a bearing loss resulting from a current rise following an increase in an oil internal pressure of the radial gap while the motor is driven.

However, if such an annular groove 510 is to be formed simultaneously with formation of the dynamic pressure-generating grooves 506 and 508, the following disadvantages occur. As shown in FIG. 11, if a protrusion of a cylindrical pin corresponding to the annular groove 510 is pressed against the inner peripheral surface of the sleeve 504, surrounding regions of a region in which the annular groove 510 is to be formed are also attracted toward a direction in which the protrusion of the cylindrical pin goes forward (downward in FIG. 11). As a result, hills 508a and 506a adjacent to the annular groove 510 are formed lower than the other hills by At. Due to this, while the motor is driven, boost pressures applied to central portions of the respective fluid dynamic pressure bearings 512 and 514 cannot be increased in the regions of the dynamic pressure-generating grooves 506 and 508 adjacent to the annular groove 510, respectively. Predetermined pressures cannot be obtained in the respective fluid dynamic pressure bearings 512 and 514, accordingly. As a result, rigidities of the bearings 512 and 514 are reduced and the bearings 512 and 514 are often incapable of stably supporting the shaft 502.

BRIEF SUMMARY OF THE INVENTION

According to the present invention, a fluid dynamic pressure bearing excellent in both reliability and durability, a spindle motor including this fluid dynamic pressure bearing, and a recording disk drive including this spindle motor can be realized by preventing a reduction in an oil boost pressure of each dynamic pressure-generating grooves for forcing an oil into a central portion of a fluid dynamic pressure bearing.

According to one aspect of the present invention, there is provided a fluid dynamic pressure bearing comprising: a shaft; and a sleeve made of a porous material which is impregnated with a lubricating fluid, and the shaft being rotating relatively about a rotation central axis.

An upper radial dynamic pressure bearing and a lower radial dynamic pressure bearing are adjacently located around a location between said shaft and said sleeve.

An upper and lower radial dynamic pressure bearing are adjacently located around a location between said shaft and said sleeve, and said upper and lower radial dynamic pressure bearings have a micro gap between said shaft and said sleeve, and said lubricating fluid is filled in said micro gap as a working fluid for inducing a dynamic pressure when said motor is rotating.

An upper radial dynamic pressure-generating grooves is formed on an upper inner peripheral surface of said sleeve in said upper radial dynamic pressure bearing by plastic deformation, a lower radial dynamic pressure-generating grooves is formed on a lower inner peripheral surface of said sleeve by plastic deformation, and said upper radial dynamic pressure-generating grooves are formed continuously to said upper radial dynamic pressure-generating grooves.

In addition, an annular groove recessed radially inward is formed on an outer peripheral surface of the shaft at a place facing a borderline between the upper radial dynamic pressure-generating grooves and the lower radial dynamic pressure-generating grooves.

The fluid dynamic pressure bearing according to one aspect of the present invention can effectively prevent a reduction in the oil boost pressure of each dynamic pressure-generating grooves for forcing the oil into the central portion of the fluid dynamic pressure bearing as well as an increase in the bearing loss. The fluid dynamic pressure bearing excellent in both reliability and durability can be, therefore, provided.

DETAILED DESCRIPTION OF THE INVENTION

Embodiments of a fluid dynamic pressure bearing, a spindle motor including this fluid dynamic pressure bearing, and a recording disk drive including this spindle motor according to the present invention will be described with reference to FIGS. 1 to 9. In the description, even if position relationships and directions of respective members are described using such terms as "up", "down", "left", "right", "vertical", and "horizontal", these expressions apply only in the respective drawings and do not indicate position relationships and directions thereof when the members are actually incorporated into an apparatus.

First Embodiment

Overall Structure of Spindle Motor

Figure 1:
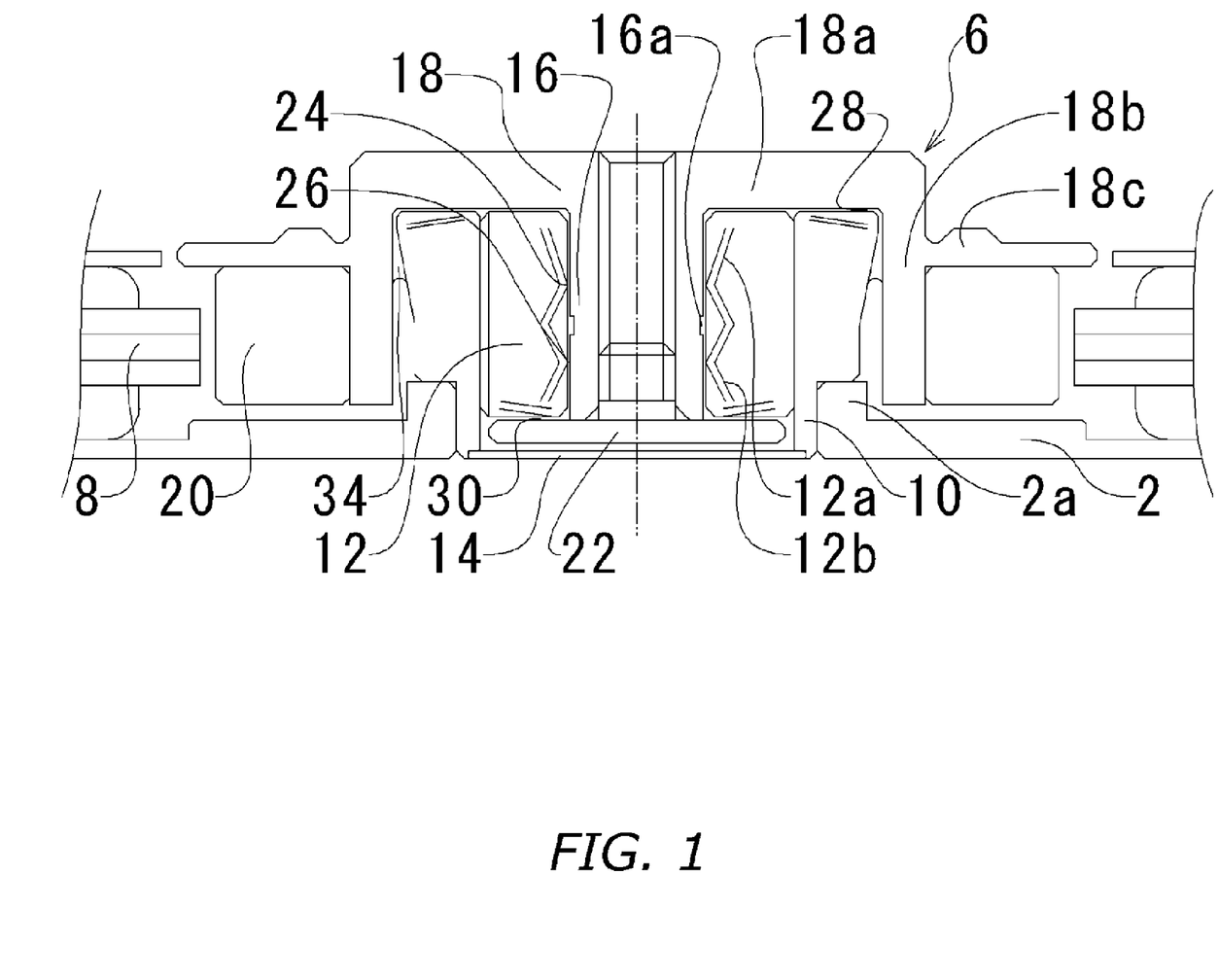
FIG. 1 is a longitudinal sectional view of a spindle motor according to a first embodiment of the present invention.

As shown in FIG. 1, a spindle motor according to a first embodiment of the present invention basically includes a bracket 2, a bearing housing 10 fixed to the bracket 2, a sleeve 12 fixed to an inner periphery of the bearing housing 10, and a rotor 6 rotatably supported by the sleeve 12.

A cylindrical portion 2a is formed around a central hole, into which the bearing housing 10 is fixedly fitted, in a central portion of the bracket 2. A stator 8 is held on an outer periphery of the cylindrical portion 2a by both or one of press-fitting and bonding or the like. The bearing housing 10 is held on an inner periphery of the cylindrical portion 2a by both or one of press-fitting and bonding or the like.

The bearing housing 10 in the form of a hollow cylinder includes a plate-shaped counter plate 14 that closes an axially lower portion of the bearing housing 10. The cylindrical sleeve 12 including a bearing hole that axially penetrates a central portion of the sleeve 12 is held on an inner periphery of the bearing housing 10. This sleeve 12 is formed out of a porous sintered material impregnated with an oil. The porous sintered material is not limited to a specific one but may be a material made from any one of various metal powers, a metal compound powder or a nonmetal powder, formed, and sintered. The sintered material contains, as a row material, Fe—Cu, Cu—Sn, Cu—Sn—Pb, Fe—C or the like. By forming the sleeve 12 out of the porous sintered material, the sleeve 12 can be manufactured at a low cost, as compared with cutting and the other machining methods.

The rotor 6, which is a rotation member, includes a shaft 16 radially facing an inner peripheral surface of the sleeve 12 through a micro gap and a generally cup-shaped rotor hub 18 formed integrally with the shaft 16. The rotor hub 18 includes a rotor upper wall 18a that axially faces an upper end surface of the bearing housing 10 and an upper end surface of the sleeve 12, a peripheral wall 18b that extends from an outer periphery of the rotor upper wall 18a axially downward, and a flange 18c that is located below the peripheral wall 18b and that extends from an outer peripheral surface of the peripheral wall 18b radially outward. A hard disk (denoted by numeral 76 in FIG. 9) is attached on the outer periphery of the peripheral wall 18b and the flange 18c, and a rotor magnet 20 is held on the outer periphery of the peripheral wall 18b below the flange 18c by adhesive or the like.

A thrust plate 22, which is an annular member, is fixed to a lower end of the shaft 16. Upper and lower end surfaces of the thrust plate 22 axially face a lower end surface of the sleeve 12 and an upper end surface of the counter plate 14 through micro gaps, respectively, while an outer peripheral surface of the thrust plate 22 radially faces an inner peripheral surface of the bearing housing 10 through gap.

With this structure, a micro gap among a lower surface of the rotor upper wall 18a, an upper end surface of the bearing housing 10, and an upper end surface of the sleeve 12, a micro gap between an inner periphery of the sleeve 12 and an outer peripheral surface of the shaft 16, and a micro gap among the lower end surface of the sleeve 12, the upper end surface of the counter plate 14, and the upper and lower end surfaces of the thrust plate 22 are continuous, and oil serving as a lubricating fluid is retained in the continuous micro gaps without interruption. These micro gaps are preferably equal to or smaller than 50 μm and a micro gap between the inner peripheral surface of the sleeve 12 and an outer peripheral surface of the shaft 16 is preferably equal to or smaller than 10 μm.

An inclined surface having an outside diameter reduced from the upper end surface toward downward is formed on an outer peripheral surface of an upper portion of the bearing housing 10. This inclined surface radially faces the inner peripheral surface of the peripheral wall 18b through a gap. A size of the gap between the outer peripheral surface of the upper portion of the bearing housing 10 and the peripheral wall 18b is gradually larger as farther from the rotor upper wall 18a toward axially downward (bracket 2 side). That is, a combination of the outer peripheral surface of the upper portion of the bearing housing 10 and the peripheral wall 18b constitute a tapered seal 34. Only on the tapered seal 34, a surface tension of the oil retained in a micro gap between dynamic pressure bearings, to be described later in detail, and an external atmospheric pressure is kept in balance, and an interface between the oil and the air is formed in a meniscus fashion.

By forming the tapered seal 34 radially outward of the sleeve 12 and the bearing housing 10, an axial dimension and a volume of the tapered seal 34 can be sufficiently secured without deteriorating bearing stiffness of upper and lower radial bearings 24 and 26, to be described later in detail, formed in the micro gap between the inner peripheral surface of the sleeve 12 and the outer peripheral surface of the shaft 16. It is, therefore, possible to prevent the oil from flowing to outside of the bearings, and to provide a fluid dynamic pressure bearing excellent in both reliability and durability and a spindle motor including this fluid dynamic pressure bearing.

Thrust Dynamic Pressure Bearings

Referring to FIGS. 1, 2A to 2B, and 3, a bearing structure will be described. The upper end surface of the bearing housing 10 axially faces the lower surface of the rotor upper wall 18a trough the micro gap, and an upper thrust dynamic pressure bearing 28 is formed in the micro gap. An upper spiral grooves (not shown) are formed on the upper end surface of the bearing housing 10 so as to induce the oil radially inward (toward the outer peripheral surface of an upper portion of the shaft 16) during motor rotation.

In addition, a lower thrust dynamic pressure bearing 30 is formed in the micro gap between the lower end surface of the sleeve 12 and the upper surface of the thrust plate 22. As shown in FIG. 2B, a lower spiral grooves 12c are formed on the lower end surface of the sleeve 12 so as to induce the oil radially inward (toward the outer peripheral surface of a lower portion of the shaft 16) during the motor rotation. When the rotor 6 rotates, dynamic pressures toward radially inward are induced by the upper and the lower spiral grooves formed on the upper and the lower thrust dynamic pressure bearings 28 and 30 in the upper and the lower thrust dynamic pressure bearings 28 and 30, respectively.

The rotor 6 is pressed vertically by a floating action of the upper thrust dynamic pressure bearing 28 on the rotor 6 and a forcing-down action of the lower thrust dynamic pressure bearing 30 on the thrust plate 22. At a position at which these dynamic pressures are kept in balance, a rotation and floating position of the rotor 6 is made stable. By forming the upper and the lower thrust dynamic pressure bearings 28 and 30, bearing support forces generated by the upper and the lower thrust dynamic pressure bearings 28 and 30 act in cooperation with each other from a direction opposed to the axial direction. It is, therefore, possible to stably support rotation of the rotor 6.

The dynamic pressure-generating grooves of the upper thrust dynamic pressure bearing 28 may be a herringbone grooves. The dynamic pressure-generating grooves of the lower thrust dynamic pressure bearing 30 may be a herringbone grooves.

Radial Dynamic Pressure Bearings

The upper radial dynamic pressure bearing 24 and the lower radial dynamic pressure bearing 26 are formed in the micro gap between the inner peripheral surface of the sleeve 12 and the outer peripheral surface of the shaft 16. The upper radial dynamic pressure bearing 24 and the lower radial dynamic pressure bearing 26 include the inner peripheral surface of the sleeve 12, the outer peripheral surface of the shaft 16, and the oil retained in the micro gap between the sleeve 12 and the shaft 16 radially facing each other.

Figure 2A:
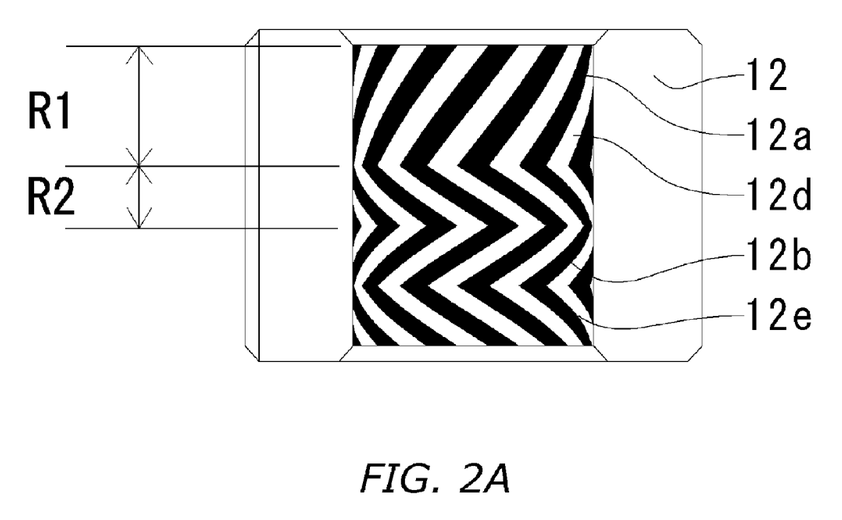
FIG. 2A is a longitudinal sectional view of a sleeve shown in FIG. 1.
Figure 2B:
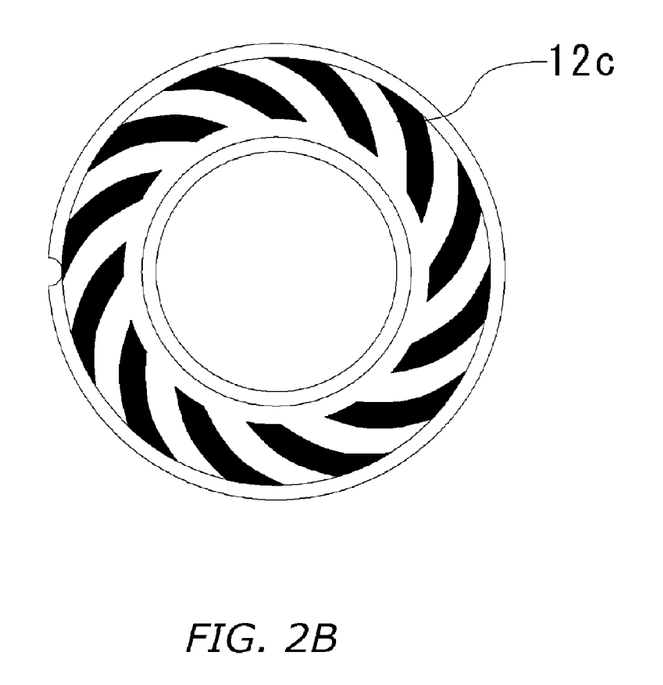
FIG. 2B is a bottom view of the sleeve shown in FIG. 2A.

As shown in FIGS. 2A and 2B, the oil is induced from axial both ends of the upper radial dynamic pressure bearing 24 to a generally central portion thereof in a region on the inner peripheral surface of the sleeve 12, which region constitutes the upper radial dynamic pressure bearing 24. In addition, an upper herringbone grooves 12a are formed axially in an unbalanced form (R1>R2). Namely, the upper herringbone grooves 12a are formed by contacting a pair of axially inclined grooves.

When the rotor 6 rotates, a moving pressure for moving the oil axially downward (toward the lower radial dynamic pressure bearing 26) is induced. Namely, the oil is induced to a central portion of the upper radial dynamic pressure bearing 24. However, since the upper herringbone grooves 12a are in the axially unbalanced form, the pressure is the highest slightly downward of the center of the upper radial dynamic pressure bearing 24 to support the rotor 6. In addition, because of its unbalanced form, the upper herringbone grooves 12a urges the oil to flow radially downward. With this structure, an internal pressure of the oil retained between the upper radial dynamic pressure bearing 24 and the lower radial dynamic pressure bearing 26 can be kept positive pressure. Therefore, occurrence of bubbles resulting from a negative pressure of oil internal pressure can be prevented.

In addition, the oil is induced from axially both ends of the lower radial dynamic pressure bearing 26 to a generally central portion thereof in a region on the inner peripheral surface of the sleeve 12, which region constitutes the lower radial dynamic pressure bearing 26. In addition, a lower herringbone grooves 12b are formed substantially in an axially balanced form.

When the rotor 6 rotates, a pressure is applied to the oil from axially both ends of the lower radial dynamic pressure bearing 26 to a generally central portion thereof. Namely, the oil is induced to the central portion of the lower radial dynamic pressure bearing 26. However, since the lower herringbone grooves 12b are formed in the axially balanced form, the pressure is the highest generally at the center of the lower radial dynamic pressure bearing 26 to support the rotor 6.

Shaft Annular Groove

Figure 3:
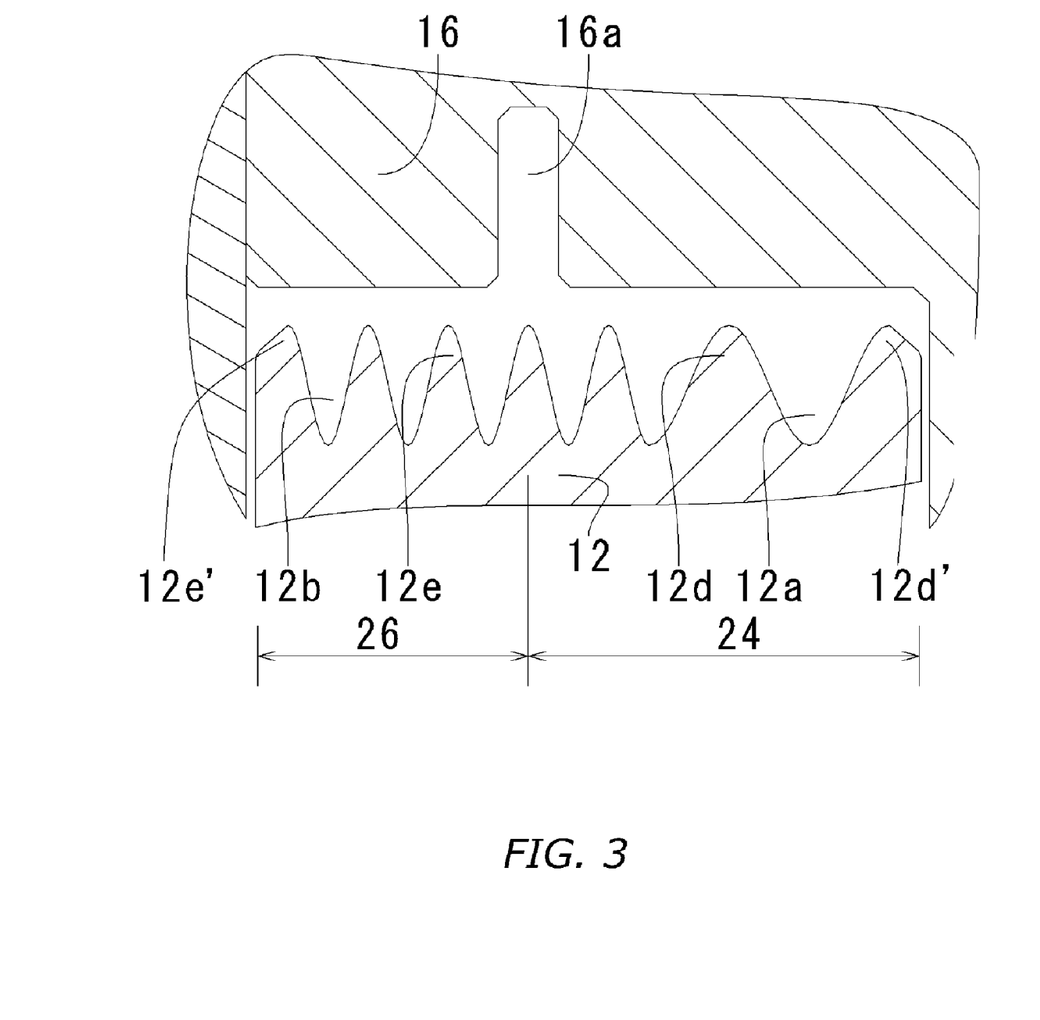
FIG. 3 is an enlarged cross-sectional view that depicts important parts of the spindle motor shown in FIG. 1.

FIG. 3 is an enlarged cross-sectional view that depicts important parts of the spindle motor shown in FIG. 1. FIG. 3 is an enlarged view that particularly enlarges the inner peripheral surface of the sleeve 12. An axially upward direction in FIG. 1 corresponds to a right direction in FIG. 3 and a radial direction in FIG. 1 corresponds to a vertical direction in FIG. 3.

As shown in FIGS. 2A, 2B, and 3, the upper herringbone grooves 12a and the lower herringbone grooves 12b are formed to be continuous to each other. Due to this, an upper herringbone hills 12d circumferentially adjacent to the upper herringbone grooves 12a and a lower herringbone hills 12e circumferentially adjacent to the lower herringbone grooves 12b are formed to be continuous to each other.

With this structure, it is possible to dispense with the annular groove 510 formed on the sleeve side in the conventional structure shown in FIG. 11. It is thereby possible to prevent an axially lower end of an upper herringbone hills 12d and an axially upper end of a lower herringbone hills 12e from being lower than the other regions of the upper herringbone hill 12d and the lower herringbone hill 12e (e.g., 12d' and 12e'). In addition, by forming the upper herringbone grooves 12a and the lower herringbone grooves 12b continuous to each other, the entire radial dynamic pressure bearing can be made small in size and thin. Accordingly, the fluid dynamic pressure bearing, the spindle motor, and the recording disk drive can be made small in size and thin as a whole.

Further, a shaft annular groove 16a recessed radially inward is formed on an outer periphery of the shaft 16 facing a region near the axially lower end of the upper herringbone grooves 12a and the axially upper end of the lower herringbone grooves 12b of the sleeve 12. With this structure, it is possible to prevent an increase in bearing loss due to a current rise resulting from an increase in the internal pressure of the oil retained in the radial gap between the above-stated region on the sleeve 12 and the outer periphery of the shaft 16.

Method for Forming Herringbone Grooves 12a and 12b

Figure 4:
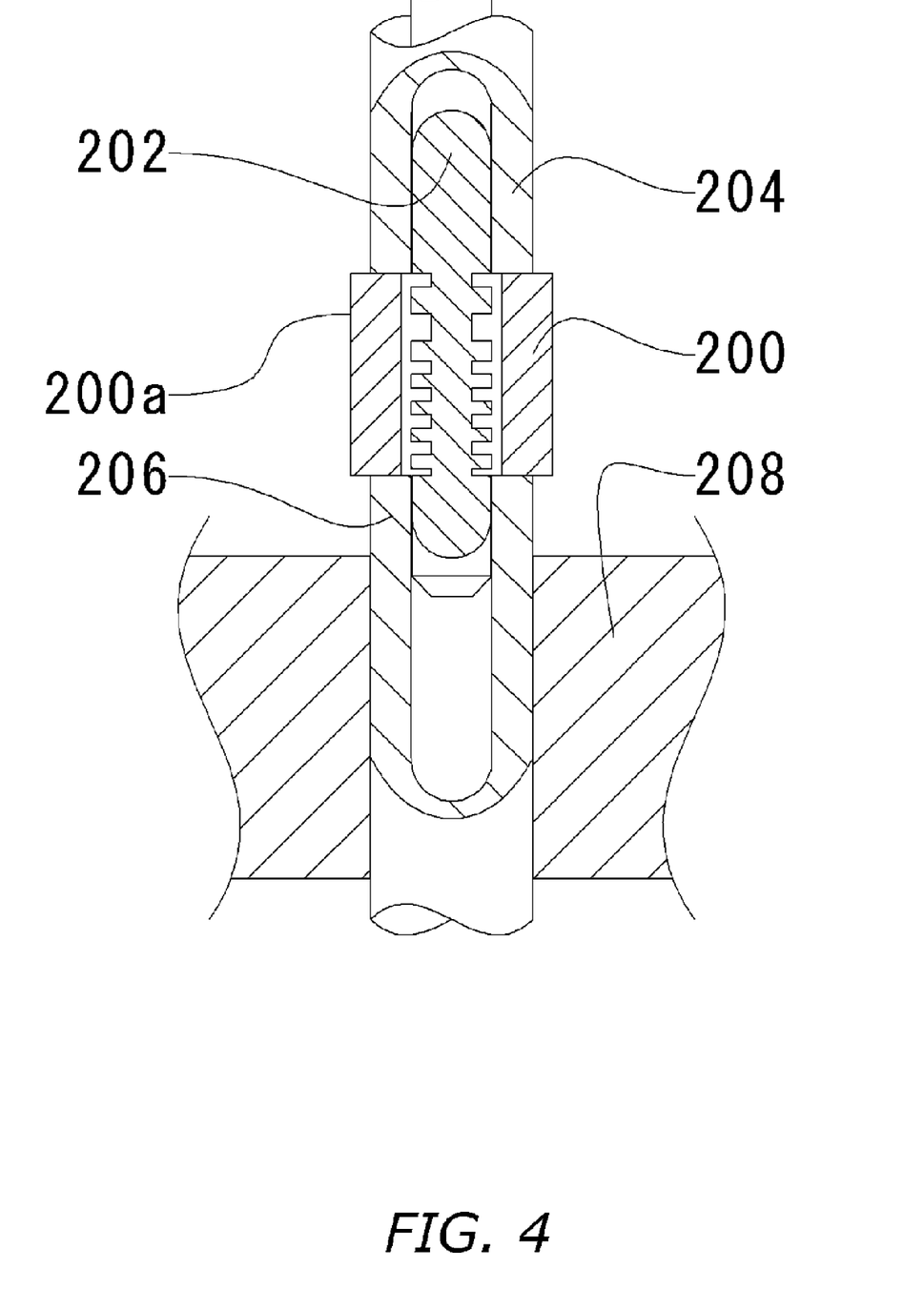
FIG. 4 is a cross-sectional view that depicts steps of forming dynamic pressure-generating grooves in the sleeve.
Figure 5:
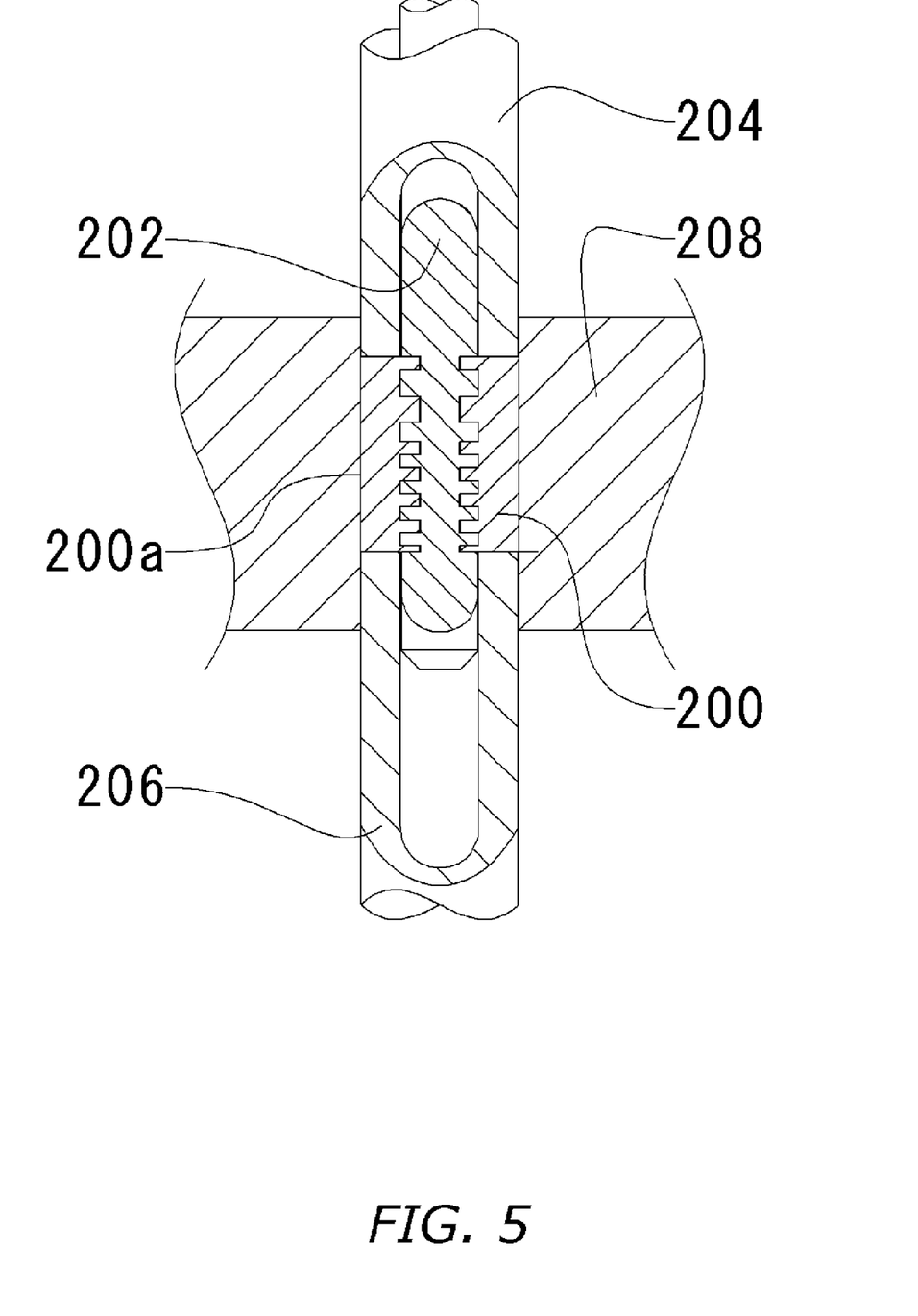
FIG. 5 is a cross-sectional view that depicts steps of forming the dynamic pressure-generating grooves in the sleeve.
Figure 6:
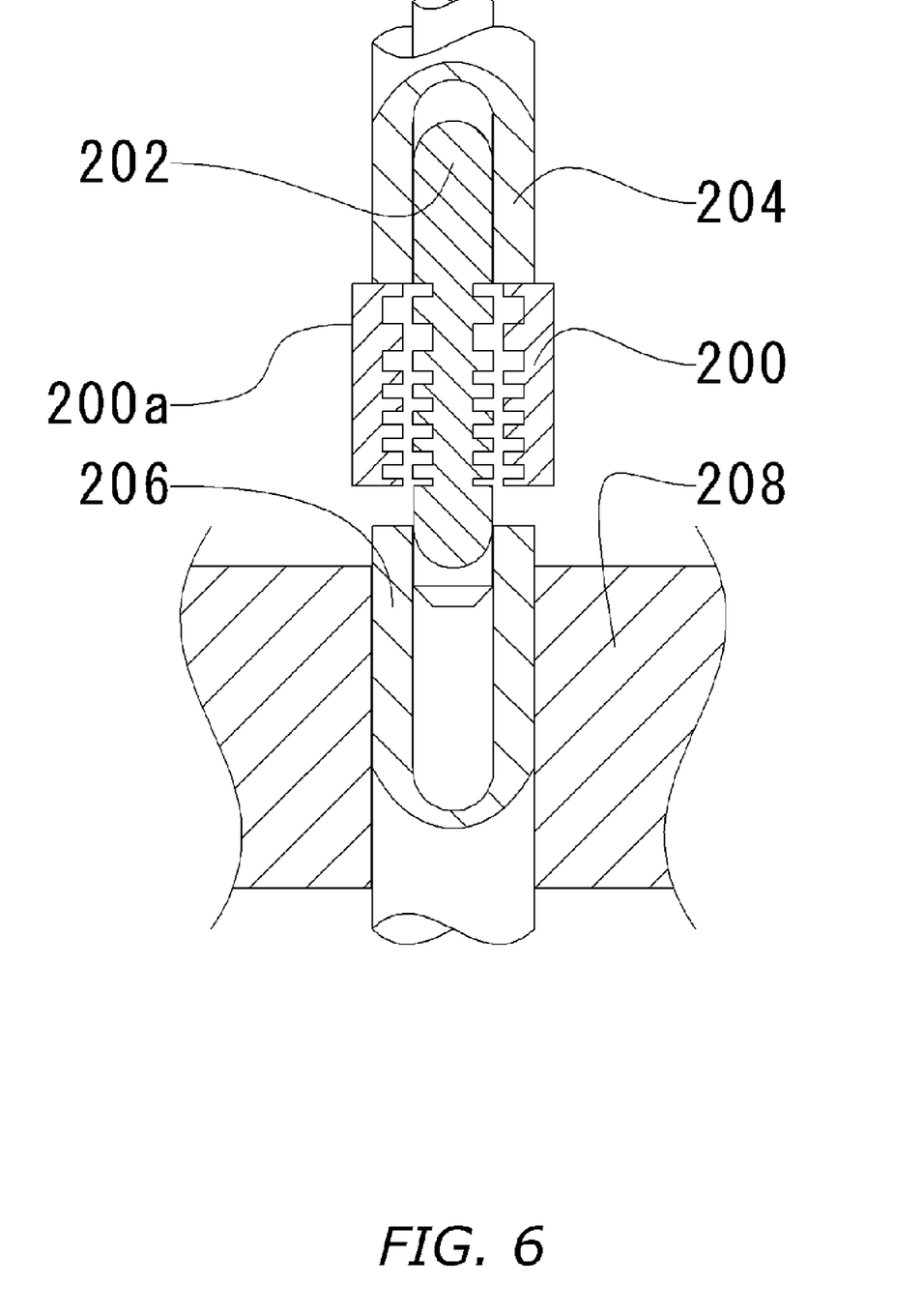
FIG. 6 is a cross-sectional view that depicts steps of forming the dynamic pressure-generating grooves in the sleeve.

A method for forming the herringbone grooves 12a and 12b on the inner peripheral surface of the sleeve 12 according to this embodiment will be described with reference to FIGS. 4 to 6. FIGS. 4 to 6 depict steps of forming the herringbone grooves 12a and 12b on a compound so as to constitute the sleeve 12 shown in FIG. 1. As shown in FIG. 4, a cylindrical pin 202 is inserted into a compound 200 based on which the sleeve 12 is to be formed, and upper and lower surfaces of the compound 200 are held by an upper punch 204 and a lower punch 206, respectively. An outside diameter of the cylindrical pin 202 is slightly smaller than a diameter of an inner peripheral surface of the compound 200, and a groove pattern for dynamic pressure-generating grooves is formed on an outer peripheral surface of the cylindrical pin 202. In this state, the compound 200 is introduced into a die 208.

Thereafter, the die 208 uniformly presses an outer periphery 200a of the compound 200. As shown in FIG. 5, the compound 200 is elastically deformed and urged by the cylindrical pin 202. As a result, the groove pattern formed on the outer peripheral surface of the cylindrical pin 202 is transferred onto the inner peripheral surface of the compound 200. When the die 208 releases pressurization, an inside diameter of the compound 200 is radially enlarged by spring back. In addition, as shown in FIG. 6, the compound 200 is introduced to an outside of the die 208 by the upper punch 204 and the lower punch 206. Thus, the inner peripheral surface of the compound 200 is formed into a radial bearing surface on which the herringbone grooves are formed.

Alternatively, a groove pattern for the dynamic pressure-generating grooves of the lower thrust bearing 30 may be formed on a lower surface of the upper punch 204 and the groove pattern may be transferred onto the upper surface of the compound 200 by press working the upper punch 204 against the compound 200. If so, grooves for the radial dynamic pressure bearings 24 and 26 and a grooves for the lower thrust bearing 30 can be simultaneously formed, thereby making it possible to reduce a manufacturing cost of the sleeve 12. Besides, accuracy for the relative position relationship between the radial dynamic pressure bearings 24 and 26 and the thrust dynamic pressure bearings 28 and 30 can be improved.

Second Embodiment

Figure 7:
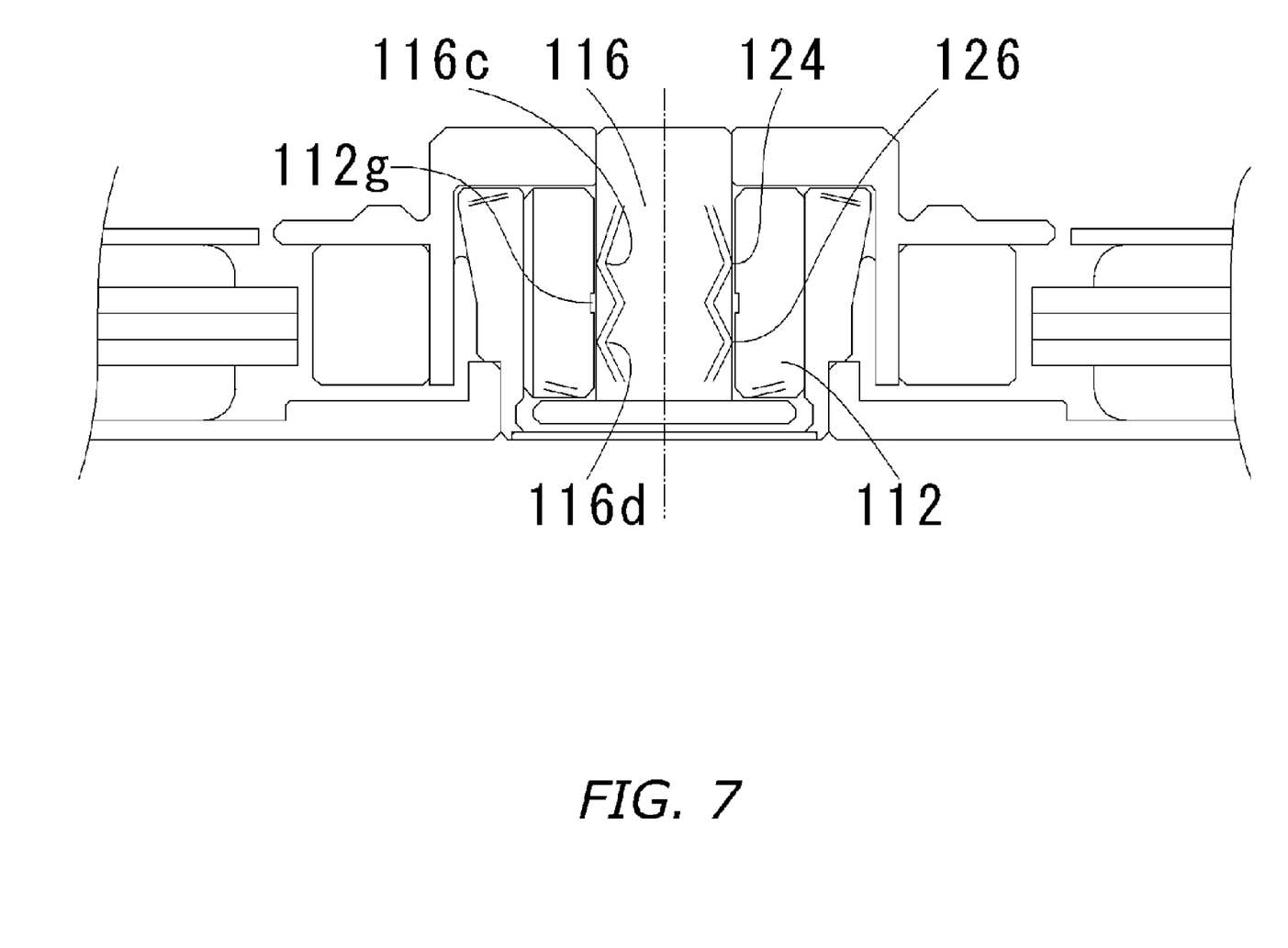
FIG. 7 is a longitudinal sectional view that depicts a spindle motor according to a second embodiment of the present invention.

FIG. 7 is a longitudinal sectional view of a spindle motor including fluid dynamic pressure bearings according to a second embodiment of the present invention. The spindle motor according to the second embodiment is equal in basic structure to that according to the first embodiment. Therefore, in FIG. 7, members are denoted by reference symbols for the corresponding members according to the first embodiment plus 100, respectively, and only different respects will be described herein.

An upper radial dynamic pressure bearing 124 and a lower radial dynamic pressure bearing 126 are formed in a micro gap between an outer peripheral surface of a shaft 116 and an inner peripheral surface of a sleeve 112. The upper radial dynamic pressure bearing 124 and the lower radial dynamic pressure bearing 126 include the inner peripheral surface of the sleeve 112, the outer peripheral surface of the shaft 116, and the oil retained in the micro gap between the sleeve 112 and the shaft 116 radially facing each other.

An upper herringbone grooves 116c and a lower herringbone grooves 116d similar in form to the upper and lower herringbone grooves 12a and 12b according to the first embodiment are formed in regions on the outer peripheral surface of the shaft 116, which regions constitute the upper radial dynamic pressure bearing 124 and the lower radial dynamic pressure bearing 126, respectively. The upper herringbone grooves 116c and the lower herringbone grooves 116d are continuous to each other. Further, a sleeve annular groove 112g recessed radially outward is formed on the inner peripheral surface of the sleeve 112 facing a region near an axially lower end of the upper herringbone grooves 116c and an axially upper end of the lower herringbone grooves 116d. With this structure, this embodiment exhibit the same advantages as those of the first embodiment.

The upper and lower herringbone grooves 116c and 116d on the shaft 116 are formed by a method, for example, for pressing a hard rotation body having a groove pattern formed on its outer periphery against the outer peripheral surface of the shaft 116, and for transferring the groove pattern onto the outer peripheral surface of the shaft 116. In addition, the shaft 116 can be formed out of a porous sintered material impregnated with oil.

Third Embodiment

Figure 8A:
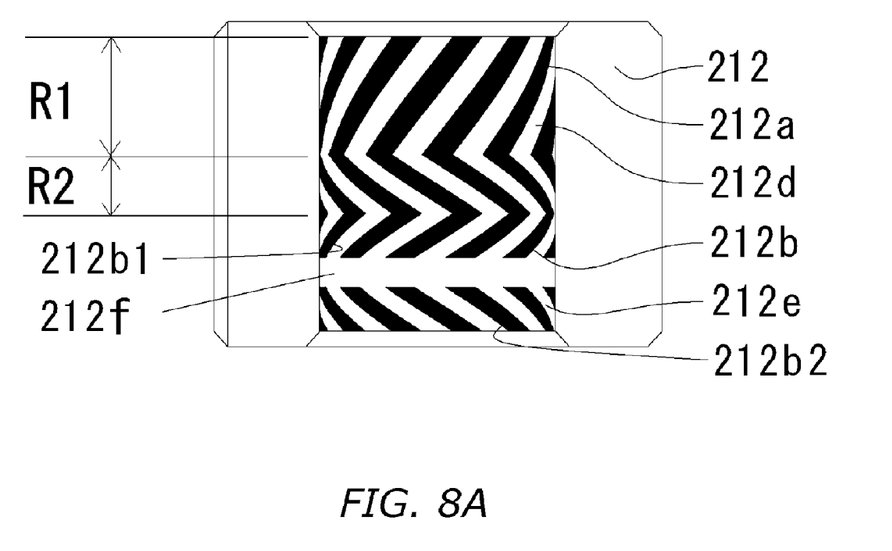
FIG. 8A is a longitudinal sectional view that depicts a spindle motor according to a second embodiment of the present invention.
Figure 8B:
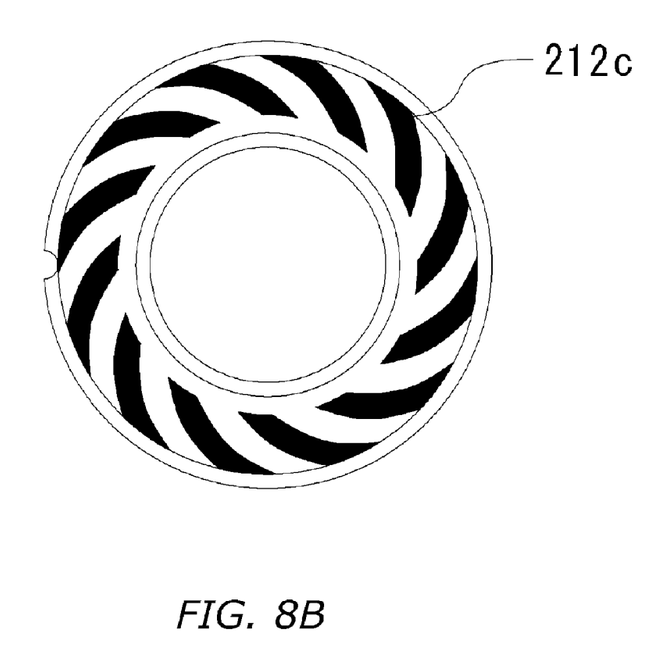
FIG. 8B is a bottom view of a sleeve shown in FIG. 8A.

FIGS. 8A and 8B are a longitudinal sectional view and a bottom view of a sleeve according to a third embodiment of the present invention, respectively. The sleeve shown in FIGS. 8A and 8B is a modification of the sleeve 12 shown in FIG. 1. In FIG. 8B, reference number 212c denotes lower spiral grooves formed on the lower end surface of the sleeve 212.

As shown in FIG. 8A, an oil is induced from axial both ends of an upper radial dynamic pressure bearing to a generally central portion thereof in a region on an inner peripheral surface of a sleeve 212, which region constitutes the upper radial dynamic pressure bearing. In addition, upper herringbone grooves 212a are formed axially in an unbalanced form (R1>R2). Namely, the upper herringbone grooves 212a are formed by contacting a pair of axially inclined grooves. In the figure, reference number 212d denotes upper herringbone hills.

When a rotor rotates, a moving pressure for moving the oil axially downward (toward the lower radial dynamic pressure bearing) is induced. Namely, the oil is induced to a central portion of the upper radial dynamic pressure bearing. However, since the upper herringbone grooves 212a are in the axially unbalanced form, the pressure is the highest slightly downward of a center of the upper radial dynamic pressure bearing to support the rotor. In addition, because of its unbalanced form, the upper herringbone grooves 212a urge the oil to flow radially downward.

In addition, the oil is induced from axially both ends of a lower radial dynamic pressure bearing to a generally central portion thereof in a region on the inner peripheral surface of the sleeve 212, which region constitutes the lower radial dynamic pressure bearing. In addition, lower herringbone grooves 212b are formed substantially in an axially balanced form. In FIG. 8A, reference number 212e denotes lower herringbone hills.

When the rotor rotates, a pressure is applied to the oil from axially both ends of the lower radial dynamic pressure bearing to a generally central portion thereof. Namely, the oil is induced to the central portion of the lower radial dynamic pressure bearing. However, since the lower herringbone grooves 212b are formed in the axially balanced form, the pressure is the highest generally at the center of the lower radial dynamic pressure bearing to support the rotor.

Further, the lower herringbone grooves 212b is formed by a pair of axially inclined grooves 212b1 and 212b2, and the paired inclined grooves 212b1 and 212b2 are formed apart from each other via a annular hill 212f. When the rotor rotates, the oil induced by the lower herringbone grooves 212b has the highest pressure near the annular hill 212f.

By mounting the sleeve 212 in the spindle motor shown in FIG. 1 as the sleeve, this embodiment exhibits the same advantages as those of the first embodiment.

Recording Disk Drive

Figure 9:
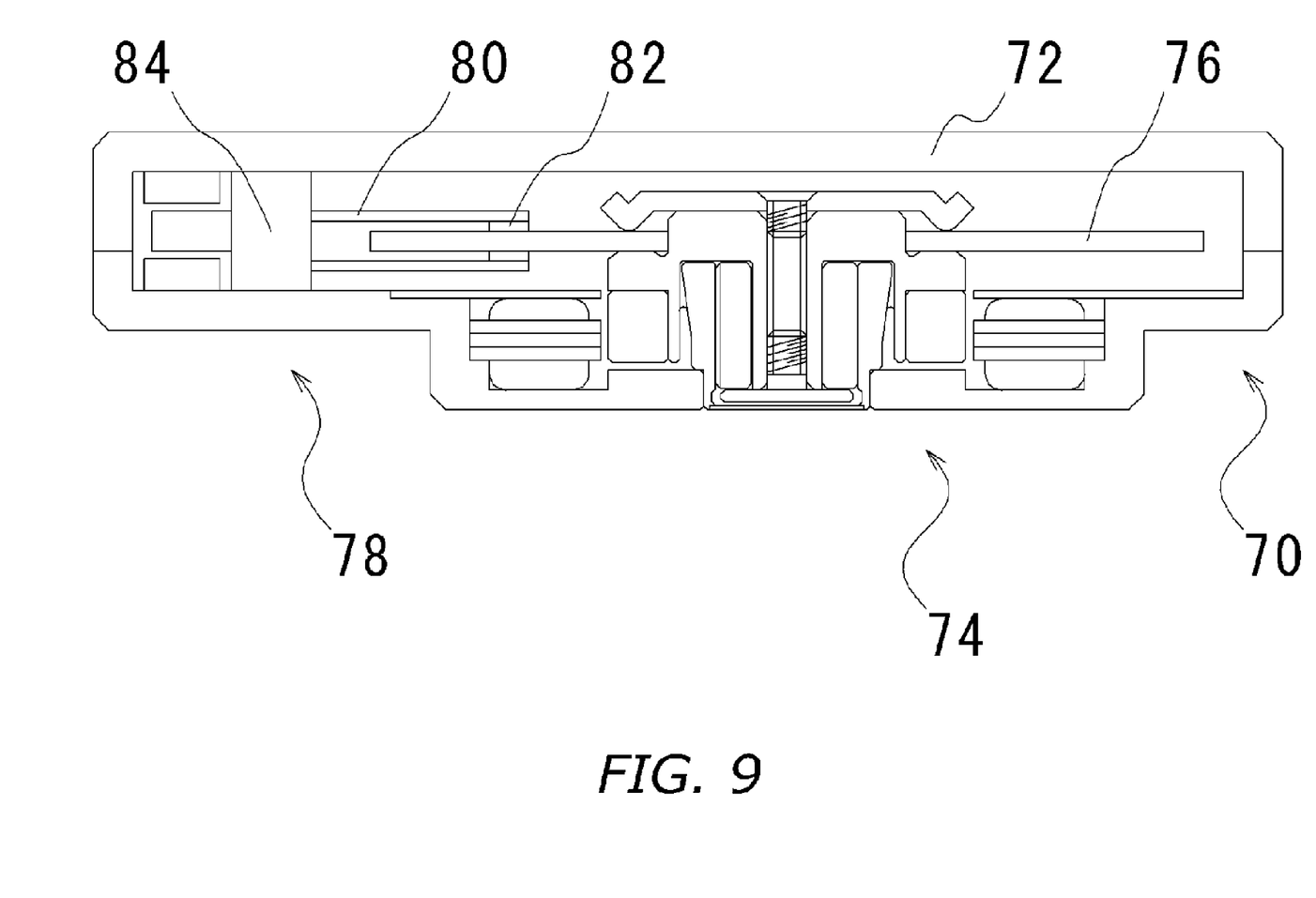
FIG. 9 is a longitudinal sectional view that depicts a recording disk drive according to the present invention.

An internal configuration of an ordinary recording disk drive 70 will be described with reference to FIG. 9.

The recording disk drive 70 is constituted by a rectangular housing 72. An interior of the housing 72 forms a clean space in which dust and the like are extremely small in amount, and a spindle motor 74 to which a disk-shaped hard disk 76 for recording information is attached is provided in the housing 72.

Further, a head moving mechanism 84 for reading and writing information from and to the hard disk 76 is provided in the housing 72. This head moving mechanism 84 includes a magnetic head 82 for reading and writing information recorded on the hard disk 76, an arm 80 that supports this magnetic head 82, and an actuator 78 that moves the magnetic head 82 and the arm 80 to required positions on the hard disk 76, respectively.

By adopting the spindle motor shown in FIGS. 1 to 8 as the spindle motor 74 of the recording disk drive 70 thus configured, it is possible to make the recording disk drive small in size and thin while ensuring good functions and to provide the recording disk drive excellent in both reliability and durability.

The embodiments of the fluid dynamic pressure bearing, the spindle motor including this fluid dynamic pressure bearing, and the recording disk drive including this spindle motor have been described so far. However, the present invention is not limited to these embodiments but various change and modifications can be made to the present invention without departure from the scope of the invention.

For instance, the structure of each fluid dynamic pressure bearing is not limited to those according to the respective embodiments, and the form, the number, and the position of the dynamic pressure-generating grooves and the type of the lubricating fluid may differ from those according to the respective embodiments.

What is claimed is:

1. A fluid dynamic pressure bearing for a motor, comprising:
   a shaft; and
   a sleeve made of a porous material which is impregnated with a lubricating fluid, the sleeve and the shaft rotating relatively about a rotation central axis;
   wherein an upper radial dynamic pressure bearing and a lower radial dynamic pressure bearing are adjacently located around a location between said shaft and said sleeve, said upper and lower radial dynamic pressure bearings have a micro gap between said shaft and said sleeve, and said lubricating fluid is filled in said micro gap as a working fluid for inducing a dynamic pressure when said motor is rotating,
   wherein upper radial dynamic pressure-generating grooves are formed on an upper inner peripheral surface of said sleeve in said upper radial dynamic pressure bearing by plastic deformation, lower radial dynamic pressure-generating grooves are formed on a lower inner peripheral surface of said sleeve by plastic deformation, and said upper radial dynamic pressure-generating grooves are formed continuously to said lower radial dynamic pressure-generating grooves, and
   wherein an annular groove recessed radially inward is formed on an outer peripheral surface of said shaft at a place facing a borderline between said upper radial dynamic pressure-generating grooves and said lower radial dynamic pressure-generating grooves.

2. The fluid dynamic pressure bearing according to claim 1, wherein said sleeve is made of a sintered metal.

3. The fluid dynamic pressure bearing according to claim 1, wherein said upper and said lower radial dynamic pressure-generating grooves are formed simultaneously by press working.

4. The fluid dynamic pressure bearing according to claim 1, wherein each bearing of said upper and said lower radial dynamic pressure bearings has a set of herringbone grooves including an upper set of grooves axially inclined in one direction and a lower set of grooves axially inclined in another direction, and each groove of said upper set of grooves and each groove of said lower set of grooves are connected to each other at an axial center of at least one of said upper and lower radial dynamic pressure bearings for forming a V-shape.

5. The fluid dynamic pressure bearing according to claim 4, wherein in said upper radial dynamic pressure bearing, an axial length of said upper set of grooves is longer than that of said lower set of grooves.

6. The fluid dynamic pressure bearing according to claim 4, wherein at least one bearing of said upper and lower radial dynamic pressure bearings has a set of grooves in which said upper set of grooves and said lower set of grooves are formed axially apart from each other.

7. The fluid dynamic pressure bearing according to claim 1, further comprising:
   a top plate fixed to said shaft;
   a thrust plate fixed to a lower portion of said shaft; and
   a bearing housing holding said sleeve on an inner periphery and having a closed lower end;
   wherein a continuous micro gap is formed among said shaft, said top plate, and said sleeve, said continuous micro gap being filled with said lubricating fluid,
   wherein an upper thrust dynamic pressure bearing including upper thrust dynamic pressure-generating grooves that induce the dynamic pressure in said lubricating fluid during the rotation of said shaft or said sleeve is formed between a lower surface of said top plate and an upper end surface of said bearing housing, and
   wherein a lower thrust dynamic pressure bearing including lower thrust dynamic pressure-generating grooves that induce the dynamic pressure in said lubricating fluid during the rotation of said shaft or said sleeve is formed between a lower end surface of said sleeve and an upper surface of said thrust plate.

8. A spindle motor comprising: the fluid dynamic pressure bearing according to claim 1; and driving means for relatively rotating said shaft and said sleeve around said rotation central axis.

9. A recording disk drive including an information writable and readable recording disk, comprising: a housing; the spindle motor according to claim 8 fixed to at least a bottom of said housing; and an information access section for writing or reading information to or from a required position of said recording disk.

10. A fluid dynamic pressure bearing for a motor, comprising:
   a shaft; and
   a sleeve made of a porous material which is impregnated with a lubricating fluid, the sleeve and the shaft rotating relatively about a rotation central axis;
   wherein an upper radial dynamic pressure bearing and a lower radial dynamic pressure bearing are adjacently located around a location between said shaft and said sleeve, said upper and lower radial dynamic pressure bearings have a micro gap between said shaft and said sleeve, and said lubricating fluid is filled in said micro gap as a working fluid for inducing a dynamic pressure when said motor is rotating, wherein upper radial dynamic pressure-generating grooves are formed on an upper outer peripheral surface of said shaft in said upper radial dynamic pressure bearing by plastic deformation, lower radial dynamic pressure-generating grooves are formed on a lower outer peripheral surface of said shaft by plastic deformation, and said upper radial dynamic pressure-generating grooves are formed continuously to said lower radial dynamic pressure-generating grooves, and wherein an annular groove recessed radially outward is formed on an inner peripheral surface of said sleeve at a place facing a borderline between said upper radial dynamic pressure-generating grooves and said lower radial dynamic pressure-generating grooves.

11. The fluid dynamic pressure bearing according to claim 10, wherein said sleeve is made of a sintered metal.

12. The fluid dynamic pressure bearing according to claim 10, wherein said upper and said lower radial dynamic pressure-generating grooves are formed simultaneously by press working.

13. The fluid dynamic pressure bearing according to claim 10, wherein each bearing of said upper and said lower radial dynamic pressure bearings has a set of herringbone grooves including an upper set of grooves axially inclined in one direction and a lower set of grooves axially inclined in another direction, and each groove of said upper set of grooves and each groove of said lower set of grooves are connected to each other at an axial center of at least one of said upper and lower radial dynamic pressure bearings for forming a V-shape.

14. The fluid dynamic pressure bearing according to claim 13, wherein in said upper radial dynamic pressure bearing, an axial length of said upper set of grooves is longer than that of said lower set of grooves.

15. The fluid dynamic pressure bearing according to claim 13, wherein at least one bearing of said upper and lower radial dynamic pressure bearings has a set of grooves in which said upper set of grooves and said lower set of grooves are formed axially apart from each other.

16. The fluid dynamic pressure bearing according to claim 10, further comprising: a top plate fixed to said shaft; a thrust plate fixed to a lower portion of said shaft; and a bearing housing holding said sleeve on an inner periphery and having a closed lower end; wherein a continuous micro gap is formed among said shaft, said top plate, and said sleeve, said continuous micro gap being filled with said lubricating fluid, an upper thrust dynamic pressure bearing including upper thrust dynamic pressure-generating grooves that induce the dynamic pressure in said lubricating fluid during the rotation of said shaft or said sleeve is formed between a lower surface of said top plate and an upper end surface of said bearing housing, and a lower thrust dynamic pressure bearing including lower thrust dynamic pressure-generating grooves that induce the dynamic pressure in said lubricating fluid during the rotation of said shaft or said sleeve is formed between a lower end surface of said sleeve and an upper surface of said thrust plate.

17. A spindle motor comprising: the fluid dynamic pressure bearing according to claim 10; and driving means for relatively rotating said shaft and said sleeve around said rotation central axis.

18. A recording disk drive including an information writable and readable recording disk, comprising: a housing; the spindle motor according to claim 17 fixed to at least a bottom of said housing; and an information access section for writing or reading information to or from a required position of said recording disk.

* * * * *